United States Patent
Son et al.

(10) Patent No.: US 9,240,860 B2
(45) Date of Patent: Jan. 19, 2016

(54) APPARATUS AND METHOD FOR OPERATING CHANNEL QUALITY INDICATOR CHANNEL ON SLEEP MODE IN BROADBAND WIRELESS COMMUNICATION SYSTEM

(75) Inventors: Yeong-Moon Son, Yongin-si (KR); Jeong-Ho Park, Seoul (KR); Hyun-Jeong Kang, Seoul (KR); Hyun-Kyu Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 13/508,338

(22) PCT Filed: Nov. 5, 2010

(86) PCT No.: PCT/KR2010/007816
§ 371 (c)(1),
(2), (4) Date: May 4, 2012

(87) PCT Pub. No.: WO2011/056024
PCT Pub. Date: May 12, 2011

(65) Prior Publication Data
US 2012/0218929 A1 Aug. 30, 2012

(30) Foreign Application Priority Data
Nov. 5, 2009 (KR) .................. 10-2009-0106642

(51) Int. Cl.
*H04W 52/02* (2009.01)
*H04L 1/00* (2006.01)

(52) U.S. Cl.
CPC .............. *H04L 1/0027* (2013.01); *H04L 1/003* (2013.01); *H04L 1/0026* (2013.01); *H04L 1/0029* (2013.01); *H04W 52/0216* (2013.01)

(58) Field of Classification Search
CPC ....... H04L 1/0027; H04L 12/56; H04L 12/28; H04W 52/02; H04W 52/0216; H04W 72/04; H04B 7/26

USPC .......................................................... 370/311
See application file for complete search history.

(56) References Cited

U.S. PATENT DOCUMENTS 8,363,581 B2 * 1/2013 Kim et al. ...................... 370/311
2007/0155392 A1 * 7/2007 Cho et al. ...................... 455/450
(Continued)

FOREIGN PATENT DOCUMENTS

KR 10-2008-0064697 7/2008
WO WO 2009/035232 A1 3/2009

OTHER PUBLICATIONS

Maruti Gupta, Text Proposal for Sleep Mode Operation for IEEE 802.16m Amendment (AWD-15.2.16), Jul. 15, 2009.*
(Continued)

*Primary Examiner* — Andrew Chriss
*Assistant Examiner* — Rasha Fayed (57) ABSTRACT

A Channel Quality Indicator (CQI) channel management in a broadband wireless communication system is provided. Operations of a base station include determining a CQI channel operation mode for a CQI channel of a terminal which enters a sleep mode; transmitting at least one message which instructs to enter the sleep mode and includes information indicating the CQI channel operation mode; and managing the CQI channel of the terminal according to the CQI channel operation mode while the terminal operates in the sleep mode. Candidates of the CQI channel operation mode include at least one of a first mode which deallocates the CQI channel in the sleep mode entry, a second mode which maintains the CQI channel in the sleep mode and forbids CQI channel allocation to other terminal during a sleep window, a third mode which deallocates the CQI channel in the sleep window entry without signaling, and a fourth mode which maintains the CQI channel in the sleep mode and allows the CQI channel allocation to other terminal during the sleep window.

22 Claims, 5 Drawing Sheets (56) References Cited

U.S. PATENT DOCUMENTS

| | | | |
|---|---|---|---|
| 2008/0085680 A1* | 4/2008 | Kim et al. | 455/69 |
| 2008/0298292 A1* | 12/2008 | Jang | 370/311 |
| 2009/0067374 A1* | 3/2009 | Yoon et al. | 370/329 |
| 2009/0207794 A1* | 8/2009 | Meylan | 370/329 |
| 2010/0254291 A1* | 10/2010 | Youn et al. | 370/311 |
| 2012/0134331 A1* | 5/2012 | Park et al. | 370/329 |

OTHER PUBLICATIONS

Yeongmon Son et al; "Proposal for CQICH allocation and de-allocation in Sleep Mode (section 15.2.16.2.5)"; IEEE 802.16-09/0057; C802.16m-09/2580r1; Nov. 18, 2009; 4 pages.*

International SearchReport dated Jul. 29, 2011 in connection with International Patent Application No. PCT/KR2010/007816.

Written Opinion of International Searching Authority dated Jul. 29, 2011 in connection with International Patent Application No. PCT/KR2010/007816.

Extended European Search Report dated Nov. 6, 2014 in connection with European Patent Application No. 10828559.4; 7 pages.

Segal, et al.; "H-ARQ Support Corrections for OFDMA PHY Mode from MAC Perspective"; IEEE 802.16 BWAWG; C802.16d-04/76; XP-002347036; Apr. 15, 2004; 22 pages.

Lasker, Y.; "CQI Channel Allocation During Sleep Mode"; IEEE BWAWG; C602.16maint-06/052; Sep. 22, 2006 4 pages.

Notice of Preliminary Rejection dated Sep. 17, 2015 in connection with Korean Patent Application No. 10-2009-0106642; 10 pages.

Chen, et al.; "ASN.1 Coding for Sleep Mode Configuration MAC Management Messages"; IEEE C802.116m-10/0213; Mar. 5, 2009; 9 pages.

Lasker, Yonah; "CQI Channel Allocation During Sleep Mode"; IEEE C802.16maint-06/052; Sep. 22, 2006; 4 pages.

* cited by examiner

APPARATUS AND METHOD FOR OPERATING CHANNEL QUALITY INDICATOR CHANNEL ON SLEEP MODE IN BROADBAND WIRELESS COMMUNICATION SYSTEM

CROSS-REFERENCE TO RELATED APPLICATIONS

The present application claims priority under 35 U.S.C. §365 to International Patent Application No. PCT/KR2010/007816 filed Nov. 5, 2010, entitled "APPARATUS AND METHOD FOR OPERATING CHANNEL QUALITY INDICATOR CHANNEL ON SLEEP MODE IN BROADBAND WIRELESS COMMUNICATION SYSTEM". International Patent Application No. PCT/KR2010/007816 claims priority under 35 U.S.C. §365 and/or 35 U.S.C. §119(a) to Korean Patent Application No. 10-2009-0106642.5 filed Nov. 5, 2009, and which are incorporated herein by reference into the present disclosure as if fully set forth herein.

TECHNICAL FIELD

The present invention relates generally to a broadband wireless communication system. More particularly, the present invention relates to an apparatus and a method for operating a Channel Quality Indicator (CQI) channel in a sleep mode in a broadband wireless communication system.

BACKGROUND ART

A fourth generation (4G) communication system, which is a next-generation communication system, is under development to provide users with services of various Quality of Service (QoS) levels at a data rate of about 100 Mbps. Particularly, the 4 G communication systems are advancing in order to support high speed services by guaranteeing mobility and QoS in Broadband Wireless Access (BWA) communication systems such as wireless Local Area Network (LAN) systems and wireless Metropolitan Area Network (MAN) systems. Representative communication systems include an Institute of Electrical and Electronics Engineers (IEEE) 802.16 communication system.

In the IEEE 802.16 system, a Channel Quality Indicator (CQI) channel indicates an uplink subchannel used to periodically transmit a radio channel quality measured by a terminal, to a base station. That is, the base station receives the CQI from the terminal and thus determines a Modulation and Coding Scheme (MCS) to apply to downlink traffic transmission using the CQI. For doing so, the terminal is assigned a CQI channel from the base station. The CQI channel allocation is carried out using Information Element (IE) for allocating the CQI channel, in an uplink map message. According to the IEEE 802.16 standard, the CQI channel is allocated according to a period and a duration. That is, the CQI channel is periodically allocated for the duration through one-time allocation information transmission.

The IEEE 802.16 system defines a sleep mode to facilitate scheduling of the base station and to reduce power consumption of the terminal. The sleep mode divides an operation time of the terminal to a sleep window and a listening window, and controls to suspend the communication of the terminal suspends during the sleep window and to perform the communication of the terminal only in the listening window. The entry to the sleep mode is accomplished the request of the terminal and the acceptance of the base station, or the instruction of the base station.

Since the CQI channel is allocated periodically for the defined duration, the entry to the sleep mode when the CQI channel is already allocated hinders management of the CQI channel. That is, even when the CQI channel is allocated on the periodic basis, the CQI channel in the sleep window is wasted because the terminal does not communicate during the sleep window. When the CQI channel is deallocated at the same time as the sleep mode entry in order to avoid the waste, it is necessary to allocate the CQI channel for the communication in the listening window and to deallocate the CQI channel as the listening window ends. That is, the repetitive CQI channel allocation/deallocation in every listening window increases signaling overhead.

While the CQI channel and the sleep mode are defined for the sake of the efficient operation of the communication system, the CQI channel management is ambiguous in the sleep mode entry as discussed above. Hence, what is needed is a method for minimizing the resource waste and the signaling overhead by effectively operating the CQI channel in the sleep mode.

DISCLOSURE OF INVENTION

Solution to Problem

To address the above-discussed deficiencies of the prior art, it is a primary aspect of the present invention to provide an apparatus and a method for effectively operating a CQI channel in a sleep mode in a broadband wireless communication system.

Another aspect of the present invention is to provide an apparatus and a method for minimizing signaling overhead when a CQI channel is allocated and deallocated in a sleep mode in a broadband wireless communication system.

Yet another aspect of the present invention is to provide an apparatus and a method for automatically deallocating a CQI channel when a terminal in a sleep mode enters a sleep window in a broadband wireless communication system.

Still another aspect of the present invention is to provide an apparatus and a method for allocating a CQI channel of a terminal entering a sleep window to other terminal in a broadband wireless communication system.

According to one aspect of the present invention, an operating method of a base station in a broadband wireless communication system includes determining a Channel Quality Indicator (CQI) channel operation mode for a CQI channel of a terminal which enters a sleep mode; transmitting at least one message which instructs to enter the sleep mode and includes information indicating the CQI channel operation mode; and managing the CQI channel of the terminal according to the CQI channel operation mode while the terminal operates in the sleep mode. Candidates of the CQI channel operation mode include at least one of a first mode which deallocates the CQI channel in the sleep mode entry, a second mode which maintains the CQI channel in the sleep mode and forbids CQI channel allocation to other terminal during a sleep window, a third mode which deallocates the CQI channel in the sleep window entry without signaling, and a fourth mode which maintains the CQI channel in the sleep mode and allows the CQI channel allocation to other terminal during the sleep window.

According to another aspect of the present invention, an operating method of a terminal in a broadband wireless communication system includes receiving at least one message which instructs to enter a sleep mode and includes information indicating a CQI channel operation mode; and managing a CQI channel according to the CQI channel operation mode while operating in the sleep mode. Candidates of the CQI channel operation mode include at least one of a first mode which deallocates the CQI channel in the sleep mode entry, a second mode which maintains the CQI channel in the sleep mode and forbids CQI channel allocation to other terminal during a sleep window, a third mode which deallocates the CQI channel in the sleep window entry without signaling, and a fourth mode which maintains the CQI channel in the sleep mode and allows the CQI channel allocation to other terminal during the sleep window.

According to yet another aspect of the present invention, an apparatus of a base station in a broadband wireless communication system includes a controller for determining a CQI channel operation mode for a CQI channel of a terminal which enters a sleep mode; and a transmitter for transmitting at least one message which instructs to enter the sleep mode and includes information indicating the CQI channel operation mode. The controller manages the CQI channel of the terminal according to the CQI channel operation mode while the terminal operates in the sleep mode, and candidates of the CQI channel operation mode include at least one of a first mode which deallocates the CQI channel in the sleep mode entry, a second mode which maintains the CQI channel in the sleep mode and forbids CQI channel allocation to other terminal during a sleep window, a third mode which deallocates the CQI channel in the sleep window entry without signaling, and a fourth mode which maintains the CQI channel in the sleep mode and allows the CQI channel allocation to other terminal during the sleep window.

According to still another aspect of the present invention, n apparatus of a terminal in a broadband wireless communication system includes a receiver for receiving at least one message which instructs to enter a sleep mode and includes information indicating a CQI channel operation mode; and a controller for managing a CQI channel according to the CQI channel operation mode while operating in the sleep mode. Candidates of the CQI channel operation mode include at least one of a first mode which deallocates the CQI channel in the sleep mode entry, a second mode which maintains the CQI channel in the sleep mode and forbids CQI channel allocation to other terminal during a sleep window, a third mode which deallocates the CQI channel in the sleep window entry without signaling, and a fourth mode which maintains the CQI channel in the sleep mode and allows the CQI channel allocation to other terminal during the sleep window.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

BEST MODE FOR CARRYING OUT THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for operating a Channel Quality Indicator (CQI) channel in a sleep mode in a broadband wireless communication system.

Hereinafter, an Orthogonal Frequency Division Multiplexing (OFDM)/Orthogonal Frequency Division Multiple Access (OFDMA) wireless communication system is exemplified, and the present invention is equally applicable to other wireless communication systems.

Entry to the sleep mode is carried out by transmitting and receiving a SLeeP-REQuest (SLP-REQ) message and a SLP-ReSPonse (RSP) message. Herein, while the SLP-REQ message is transmitted by a terminal, it is not necessarily needed for the sleep mode entry. The SLP-RSP message is sent by a base station, and can be transmitted in reply to the SLP-REQ message or in an unsolicited manner even when the SLP-REQ message is not received. The SLP-REQ message is used not only to enter the sleep mode but also to release the sleep mode and to switch the sleep mode.

A system according to an exemplary embodiment of the present invention defines a plurality of CQI CHannel (CQICH) operation modes to manage the CQI channel in the sleep mode. Accordingly, the base station determines the CQICH operation mode for the terminal entering the sleep mode, and informs the terminal of the determined CQICH operation mode using the SLP-RSP message. The CQICH operation modes are described.

In the first mode, when the terminal and the base station successfully enter/change/switch to the sleep mode using the SLP-REQ and SLP-RSP messages, the CQI channel is deallocated. After the successful sleep mode entry, if the CQI channel allocation is required during a listening window, the base station may allocate the CQI channel through Information Element (IE) for the CQI channel allocation during the listening window. In this case, similar to the CQI channel allocation in an active mode, the CQI channel is allocated and deallocated regardless of the sleep mode.

In the second mode, the allocated CQI channel is not affected at all regardless of the sleep mode of the terminal. Yet, even when the terminal is in the sleep window, the base station does not allocate the corresponding CQI channel to other terminal. That is, though the sleep mode terminal is sleeping, the CQI channel is not shared. Hence, while there are no traffic transmission and reception because the terminal sleeps during the sleep window, the terminal can feed the CQI back. However, it is not always necessary that the terminal should feed back the CQI in the sleep window.

In the third mode, when the terminal enters the sleep window and the terminal is already allocated the CQI channel, the CQI channel is automatically deallocated. Hence, when the CQI channel is required in the listening window, the base station needs to allocate the CQI channel again through separate signaling. However, when the terminal returns to the sleep window according to the third mode, the CQI channel allocated in the listening window is automatically deallocated. Thus, when the listening window continuously extends by applying an extended listening window, it is easy to pre-determine the duration in the IE for the CQI channel allocation. That is, when the duration of the CQI channel allocation is indefinite, the conventional technique deallocates the CQI channel by transmitting the IE instructing the CQI channel deallocation. By contrast, when the terminal returns to the sleep state, the third mode automatically deallocates the CQI channel and thus the signaling overhead for the deallocation is not necessary. Notably, the base station may deallocate the CQI channel using the IE instructing the CQI channel deallocation in the listening window in advance.

In the fourth mode, regardless of the sleep mode of the terminal, the allocated CQI channel is not affected at all. Yet, the base station can allocate other terminal the CQI channel wasted in the sleep window of the terminal; that is, in the sleep state in the sleep window of the terminal operating in the sleep mode. In this case, the CQI channel temporarily allocated to the other terminal should be deallocated before the sleep mode terminal enters the listening window. Naturally, the terminal operating in the sleep mode cannot feed back the CQI in the sleep window.

The definitions of the first mode, the second mode, the third mode, and the fourth mode are merely exemplary, and the system according to exemplary embodiments of the present invention can adopt all or part of these modes.

An example of the SLP-REQ message is shown in Table 1.

TABLE 1

Table 1

| Syntax | Size (bit) | Notes |
| --- | --- | --- |
| AAI_SLP-REQ_message_format( ) { | | |
|     Management Message Type = X | 8 | |
|     Operation | 2 | 0b00: Exit from Sleep Mode |
| | | 0b01: Enter Sleep Mode |
| | | 0b10: Change Sleep Mode |
| | | 0b11: Switch Sleep Cycle setting |
|     if(Operation != 0b00) { | | |
|         SCID | 3 | Sleep Cycle ID |
|         Start Frame Number | 6 | Least Significant 6 bits of Frame Number |
|         if(Operation != 0b11) { | | |
|             LWEF | 1 | Listening Window Extension Flag |
| | | 0: Listening Window Extenson is disabled |
| | | 1: Listening Window Extenson is enabled |
|             TIMF | 1 | Traffic Indication Message Flag |
| | | 0: AAI_TRF-IND message is not sent for the AMS |
| | | 1: AAI_TRF-IND message is sent to the AMS during every Listening Window |
|             NISCF | 1 | New Initial sleep cycle indicator |
|             Initial Sleep Cycle | 4 | |
|             Final Sleep Cycle | 10 | |
|             Listening Window | 6 | |
|             Listening sub-frame bitmap | 8 | The bitmap indicates the sub-frames in each frame where the AMS needs to remain awake 0xF: AMS shall remain awake during entire sub-frames in each frame during Listening Window |
|             If(NISCF == 1) { | | |
|                 New Initial Sleep Cycle | 6 | |
|             } | | |
|             If(LWEF == 1) { | | |
|                 T_AMS | 6 | |
|             } | | |

TABLE 1-continued

| Syntax | | Size (bit) | Notes |
|---|---|---|---|
| | Padding | variable | Padding bits to ensure byte aligned. |
| } | | | |
| } | | | |
| } | | | |

In Table 1, the 'Operation' indicates a request type of the SLP-REQ message. For example, when the 'Operation' is 0b00, the SLP-REQ message requests to release the sleep mode. When the 'Operation' is 0b01, the SLP-REQ message requests to enter the sleep mode. When the 'Operation' is 0b10, the SLP-REQ message requests to change a sleep cycle. When the 'Operation' is 0b11, the SLP-REQ message requests to switch to a sleep cycle pre-negotiated.

The 'SCID' is an identifier for distinguishing setting information of the sleep cycle currently requested.

The 'TIMF' is a parameter for negotiating whether to transmit an Advanced Air Interface TRaFfic-INDicator (AAI_TRF-IND) message informing of presence or absence of downlink traffic, to the corresponding terminal. For example, the 'TIMF' 1 signifies that the terminal requests to transmit the AAI_TRF-IND message when unicast traffic to the terminal waits to transmit in the listening window, and the 'TIMF' 0 signifies that the AAI_TRF-IND message is not requested.

The 'NISCF' indicates whether a new initial sleep cycle is contained in the SLP-REQ message. Basically, when there exists the traffic for the listening window, 'Current Sleep Cycle' is set to the initial sleep cycle. However, when the 'NISCF' is set to 1, the sleep cycle is initialized according to the new initial sleep cycle.

The 'Start_Frame_Number' indicates an application point of the new sleep cycle.

The 'Initial_Sleep_Cycle' indicates the initial sleep cycle of a sleep cycle pattern. The sleep cycle is initiated by the 'Initial_Sleep_Cycle', and can double until it reaches the final sleep cycle.

The 'Final Sleep Cycle' indicates the last sleep cycle of the sleep cycle pattern.

The 'Listening_Window' indicates basic listening window duration for the terminal to transmit and receive data to and from the base station.

The 'Listening sub-frame bitmap' indicates a sub-frame in the listening state when the terminal performs micro-sleep operation at the sub-frame level within a frame constituting the listening window.

The 'New Initial Sleep Cycle' is contained when the 'NISCF' is set to 1. When the sleep cycle is to be set to a particular sleep cycle, rather than the initial sleep cycle, the 'New Initial Sleep Cycle' indicates the particular sleep cycle.

When the listening window is extendable, the 'T_AMS' is a timer designating the extension point. The 'T_AMS' is reset upon every reception of ACKnowledge (ACK) for the downlink traffic/map/uplink traffic from the base station. Every time the 'T_AMS' is reset, the listening window is extended.

An example of the SLP-RSP message is shown in Table 2.

TABLE 2

| Syntax | Size (bit) | Notes |
|---|---|---|
| AAI_SLP-RSP_message_format( ) { | | |
|     Management Message Type = X+1 | 8 | |
|     Response_Code | 2 | 0b00: Request by ABS in Unsolicited manner<br>0b01: Approval of AAI_SLP-REQ<br>0b10: Rejection of AAI_SLP-REQ<br>0b11: Reserved |
|     if(Response_Code == 0b00 \|\| Response_Code == 0b01) { | | |
|         Operation | 2 | 0b00: Exit Sleep Mode<br>0b01: Enter Sleep Mode<br>0b10: Change Sleep Mode<br>0b11: Switch Sleep Cycle setting |
|         if(Operation != 0b00) { | | |
|             SCID | | Sleep Cycle ID |
|             Start_Frame_Number | 6 | Least Significant 6 bits of Frame Number |
|             CQICH operation during Sleep Mode | 2 | 0b00: CQICH is deallocated in the frame specified by Start_Frame_Number<br>0b01: CQICH is will be kept until the frame specified by Allocation Duration(d)<br>0b10: CQICH is automatic deallocated at the beginning of Sleep Window if there has been allocated CQICH during LW<br>0b11: Reserved |

TABLE 2-continued

Table 2

| Syntax | Size (bit) | Notes |
|---|---|---|
|     if(Operation != 0b11) { | | |
|         TIMF | 1 | 0: Traffic Indication via AAI_TRF-IND message is disabled<br>1: Traffic Indication via AAI TRF-IND message is enabled |
|         NISCF | | |
|         LWEF | 1 | Listening Window Extension Flag<br>0: Listening Window Extenson is disabled<br>1: Listening Window Extenson is enabled |
|         Initial Sleep Cycle | 8 | — |
|         Final Sleep Cycle | 10 | |
|         Listening Window | 6 | |
|         Listening sub-frame bitmap | 8 | The bitmap indicates the sub-frames in each frame where the AMS needs to remain awake<br>0xF: AMS shall remain awake during entire sub-frames in each frame during Listening Window |
|         if(TIMF == 1) { | | |
|             SLPID | 10 | — |
|         } | | |
|         If(NISCF == 1) { | | |
|             New Initial Sleep Cycle | 6 | |
|         } | | |
|         If(LWEF == 1) { | | |
|             T_AMS | 6 | |
|         } | | |
|         } | | |
|     } | | |
|     } | | |
|     else if (Response_Code == 0b10) { | | |
|         REQ_duration | 8 | Least Significant 8 bits of Frame Number |
|     } | | |
|     Padding | variable | Padding bits to ensure byte aligned. |
| } | | |

The 'Response_Code' indicates a response type of the SLP-RSP message. For example, the 'Response_Code' 0b00 indicates the unsolicited manner, the 'Response_Code' 0b01 indicates the solicitation, and the 'Response_Code' 0b10 indicates the solicitation refusal. In case of the unsolicited manner, the terminal should follow the request of the base station.

The 'Operation' indicates the operation type of the SLP-RSP message. That is, the 'Operation' indicates the entry/change/release/switching of the sleep mode. For example, the 'Operation' 0b00 signifies the release of the sleep mode, the 'Operation' 0b01 signifies the entry to the sleep mode, the 'Operation' 0b10 signifies the change of the sleep cycle, and the 'Operation' 0b11 signifies the switching to the pre-negotiated sleep cycle.

The 'SCID' is an identifier for distinguishing the sleep cycle setting information currently requested/approved.

The 'TIMF' is a parameter for negotiating whether to transmit the AAI_TRF-IND message informing of the presence or absence of the downlink traffic, to the corresponding terminal.

The 'NISCF' indicates whether a new initial sleep cycle is contained in the SLP-REQ message. Basically, when there exists the traffic for the listening window, 'Current Sleep Cycle' is set to the initial sleep cycle. However, when the 'NISCF' is set to 1, the sleep cycle is initialized according to the new initial sleep cycle.

The 'Start_Frame_Number' indicates an application point of the new sleep cycle.

The 'Initial_Sleep_Cycle' indicates the initial sleep cycle of the sleep cycle pattern. The sleep cycle is initiated by the 'Initial_Sleep_Cycle', and can double each time until it reaches the final sleep cycle.

The 'Final Sleep Cycle' indicates the last sleep cycle of the sleep cycle pattern.

The 'Listening_Window' indicates the basic listening window duration for the terminal to transmit and receive data to and from the base station.

The 'Listening sub-frame bitmap' indicates a sub-frame operating in the listening state when the terminal performs the micro-sleep operation at the sub-frame level within the frame constituting the listening window.

The 'SLPID' is an identifier for the traffic indicator allocated to the terminal when the AAI_TRF-IND message is sent to the terminal. The terminal, based on the identified SLPID, acquires the presence or absence of the DL traffic by checking whether the AAI_TRF-IND message includes the corresponding SLPID, or whether the bit mapped to the SLPID is set to 1 in the SLPID Bitmap.

The 'REQ-duration' is used to reject the request of the terminal, and indicates the re-request possible point. That is, the terminal can make a request again after the time indicated by the 'REQ-duration' passes by.

The 'New Initial Sleep Cycle' is contained when the 'NISCF' is set to 1. When the sleep cycle is to be set to a particular sleep cycle, rather than the initial sleep cycle, the 'New Initial Sleep Cycle' indicates the particular sleep cycle.

When the listening window is extendable, the 'T_AMS' is a timer designating the extension point. The 'T_AMS' is reset upon every reception of the ACK for the downlink traffic/map/uplink traffic from the base station. Every time the 'T_AMS' is reset, the listening window is extended.

The 'CQICH Operation during Sleep Mode' indicates the operation mode for the CQI channel in the sleep mode. The operation mode which can be indicated by the 'CQICH Operation during Sleep Mode' is at least one of the first mode, the second mode, the third mode, and the fourth mode.

According to one exemplary embodiment of the present invention, the 'CQICH Operation during Sleep Mode' designates one of the first mode, the third mode and the fourth mode. That is, the 'CQICH Operation during Sleep Mode' set to 0b00 indicates the first mode, the 'CQICH Operation during Sleep Mode' set to 0b01 indicates the fourth mode, and the 'CQICH Operation during Sleep Mode' set to 0b10 indicates the third mode.

According to another exemplary embodiment of the present invention, the 'CQICH Operation during Sleep Mode' designates one of the first mode, the second mode, the third mode and the fourth mode. That is, the 'CQICH Operation during Sleep Mode' set to 0b00 indicates the first mode, the 'CQICH Operation during Sleep Mode' set to 0b01 indicates the second mode, the 'CQICH Operation during Sleep Mode' set to 0b10 indicates the third mode, and the 'CQICH Operation during Sleep Mode' set to 0b11 indicates the fourth mode.

According to yet another exemplary embodiment of the present invention, the 'CQICH Operation during Sleep Mode' is not contained in the SLP-RSP message, and the CQI channel operation mode always follows the third mode.

According to still another exemplary embodiment of the present invention, the 'CQICH Operation during Sleep Mode' can be contained in a sleep control header or a sleep control extension header, rather than the SLP-RSP message. The sleep control header is a header-type message for changing, suspending, and resuming the setting for the sleep mode, and includes at least one of an indicator indicating the end of the listening window or the extension of the listening window, a frame number in which the extended listening window ends, an indicator indicating interruption of the sleep cycle, and a frame number in which the sleep cycle is interrupted. The sleep control extension header is a header-type message piggybacked on a data header, and includes at least one of the indicator indicating the end of the listening window or the extension of the listening window, the frame number in which the extended listening window ends, the indicator indicating interruption of the sleep cycle, and the frame number in which the sleep cycle is interrupted.

Figure 1:
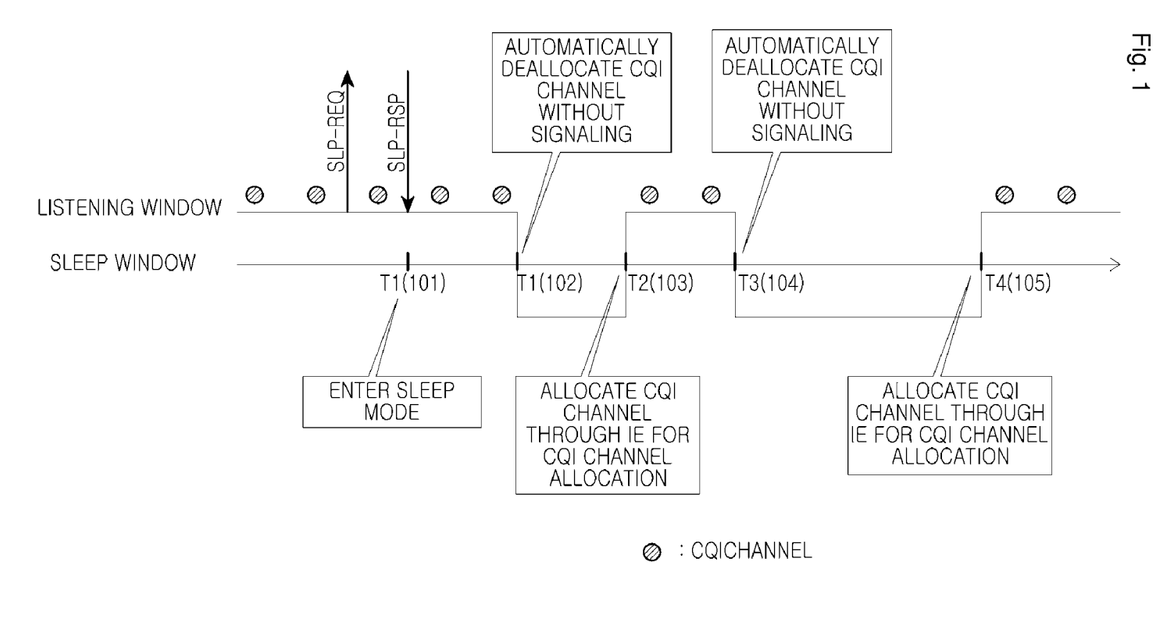
FIG. 1 illustrates Channel Quality Indicator (CQI) channel operation in a sleep mode in a broadband wireless communication system according to an exemplary embodiment of the present invention.

When the SLP-RSP message according to the exemplary embodiments of the present invention is used, the CQI channel operation of FIG. 1 is possible.

FIG. 1 illustrates an example of the CQI channel operation in the sleep mode in the broadband wireless communication system according to an exemplary embodiment of the present invention. FIG. 1 illustrates the example where the CQI channel operation mode is the third mode.

Referring to FIG. 1, the terminal is allocated the CQI channel from the base station, and is communicating as periodically feeding back the CQI over the CQI channel. Herein, the CQI channel is allocated through the IE for the CQI channel allocation, and the IE can be called 'CQICH Allocation IE' or 'Feedback Allocation IE'. The terminal requests the sleep mode entry by transmitting the SLP-REQ message to the base station, the base station transmits the SLP-RSP message allowing the sleep mode entry, and thus the terminal enters the sleep mode at the time t1 101. In so doing, the SLP-RSP message includes the 'CQICH Operation during sleep mode' parameter, and the 'CQICH Operation during sleep mode' is set to 0b10; that is, to the value indicative of the third mode. Next, the listening window ends at the time t4 104 and the sleep window starts. At this time, according to the third mode, the CQI channel allocated to the terminal is deallocated without signaling. When the listening window starts again at the time t5 105, the base station allocates the CQI channel to the terminal using the IE for the CQI channel allocation.

Figure 2:
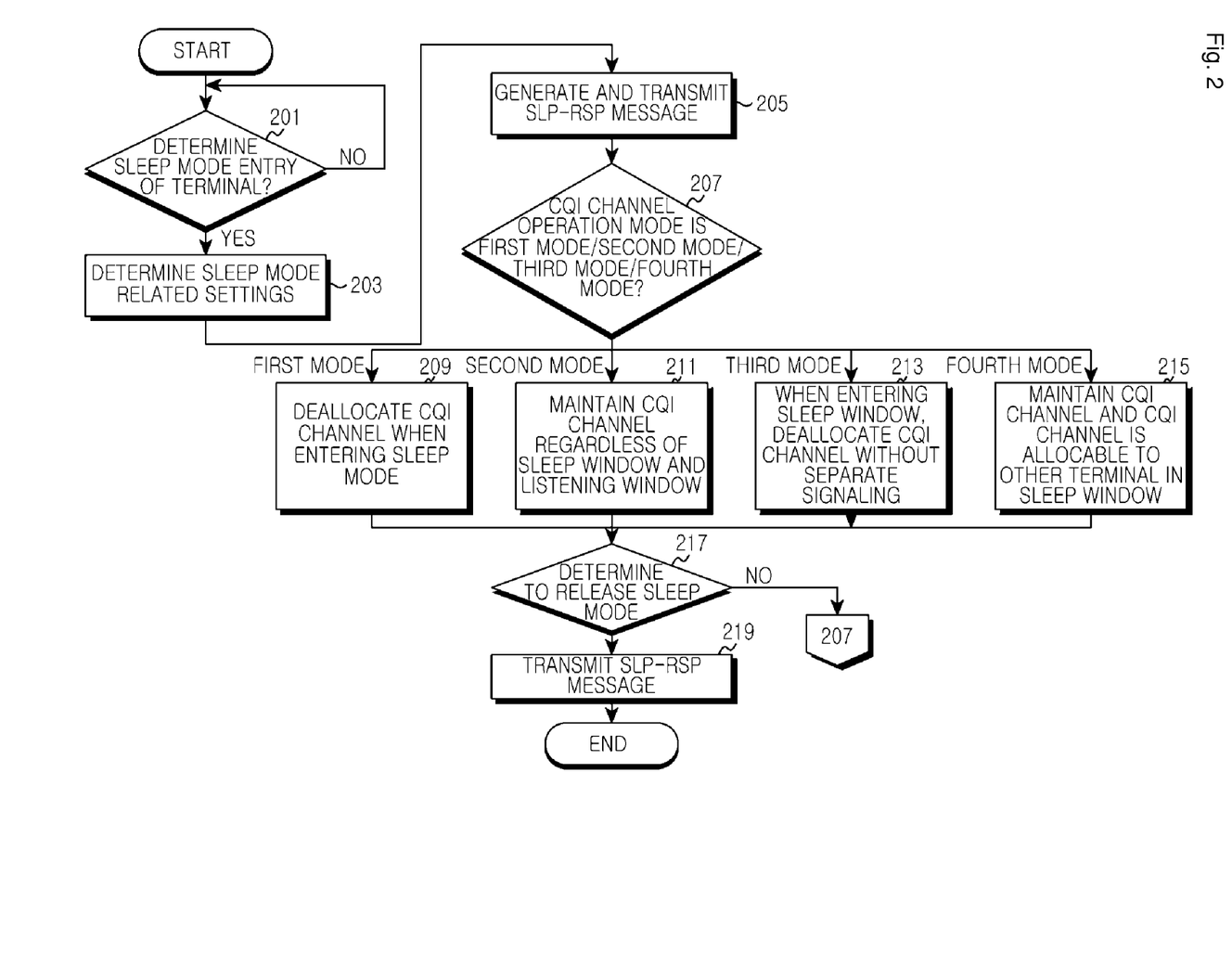
FIG. 2 illustrates a CQI channel management method of a base station in the broadband wireless communication system according to an exemplary embodiment of the present invention.

FIG. 2 illustrates a CQI channel management method of the base station in the broadband wireless communication system according to an exemplary embodiment of the present invention. FIG. 2 illustrates the CQI channel management method with respect to the terminal entering the sleep mode. Hence, while FIG. 2 depicts only the operations of the base station for the CQI channel, the base station also operates to manage the sleep window and the listening window and to transmit the AAI_TRF-IND message, for the sleep mode terminal. Hereafter, other operations according to the sleep mode, excluding the operations for the CQI channel, are omitted.

Referring to FIG. 2, the base station checks whether the sleep mode entry of the terminal is determined in step 201. The sleep mode entry of the terminal can be determined by receiving the request of the terminal; that is, by receiving the SLP-REQ message from the terminal, or according to the base station's own determination. For example, when the traffic of the terminal is lower than a threshold or when the terminal does not transmit or receive the traffic at intervals, the sleep mode entry of the terminal can be determined.

When the sleep mode entry is determined, the base station determines the settings relating to the sleep mode in step 203. That is, the base station determines the sleep cycle, whether to transmit the AAI_TRF-IND message, the size and the start point of the sleep window, and so on. In particular, the base station determines the CQI channel operation mode for the CQI channel of the terminal. For example, the CQI channel operation mode is determined by taking account of utilization of radio resources, traffic characteristics of the terminal, Hybrid Automatic Repeat reQuest (HARQ) application, and use state of the CQI channel.

After determining the setting values, the base station generates and transmits the SLP-RSP message instructing the sleep mode entry in step 205. In other words, the base station sets the parameter values according to the settings determined in step 203, and generates the SLP-RSP message including the parameters.

Next, the base station checks the CQI channel operation mode of the terminal in step 207. In this exemplary embodiment, the CQI channel operation mode is one of the first mode, the second mode, the third mode, and the fourth mode. Yet, in another embodiment of the present invention, only the first mode, the third mode, and the fourth mode can be considered.

When the CQI channel operation mode is the first mode, the base station deallocates the CQI channel of the terminal simultaneously when entering the sleep mode in step 209. In so doing, the signaling for deallocating the CQI channel is not carried out at the time of the sleep mode entry. Yet, separately from the CQI channel operation mode, the base station can allocate and deallocate the CQI channel to and from the terminal during the sleep mode using the IE for the CQI channel allocation.

When the CQI channel operation mode is the second mode, the base station maintains the CQI channel of the terminal regardless of the sleep window and the listening window in step 211. At this time, although the terminal is in the sleep state, the base station does not allocate the CQI channel of the terminal to other terminal. Hence, the base station monitors whether the CQI is fed back from the terminal during the sleep window of the terminal.

When the CQI channel operation mode is the third mode, the base station deallocates the CQI channel for the terminal every time the terminal enters the sleep window in step 213. At this time, the signaling for deallocating the CQI channel is not conducted at the time of the sleep mode entry. Thus, when the CQI channel is allocated to the terminal in the sleep window duration or the listening window duration, the CQI channel is deallocated simultaneously with the sleep window entry without signaling overhead. Separately from the automatic CQI channel deallocation according to the third mode, the base station may deallocate the CQI channel using the IE indicating the CQI channel deallocation in advance of the sleep window entry.

When the CQI channel operation mode is the fourth mode, the base station maintains the CQI channel of the terminal regardless of the sleep window and the listening window in step 215. Yet, the base station can allocate the CQI channel of the terminal to other terminal while the terminal stays in the sleep state. In this case, before the terminal enters the listening window, the base station deallocates the CQI channel allocated to the other terminal.

Next, the base station checks whether the sleep mode release of the terminal is determined in step 217. The sleep mode release of the terminal can be determined by receiving the request of the terminal; that is, by receiving the SLP-REQ message from the terminal, or according to the base station's own determination. For example, when the traffic of the terminal increases, the sleep mode release of the terminal can be determined.

When the sleep mode release is determined, the base station generates and transmits the SLP-RSP message instructing the sleep mode release in step 219. By contrast, when the sleep mode release is not determined, the base station goes back to step 207.

While it is not illustrated in FIG. 2, the base station can change the CQI channel operation mode while the sleep mode is maintained. In this case, the base station transmits the SLP-RSP message to inform of the changed CQI channel operation mode.

The embodiment in FIG. 2 considers all of the first mode, the second mode, the third mode, and the fourth mode. However, in another exemplary embodiment of the present invention, only three or less modes can be considered. In this case, the step 211 is excluded. In yet another exemplary embodiment of the present invention, the third mode alone can be considered. In this case, the SLP-RSP message does not include the information indicating the CQI channel operation mode, and the step 207, the step 209, the step 211, and the step 215 are omitted.

Figure 3:
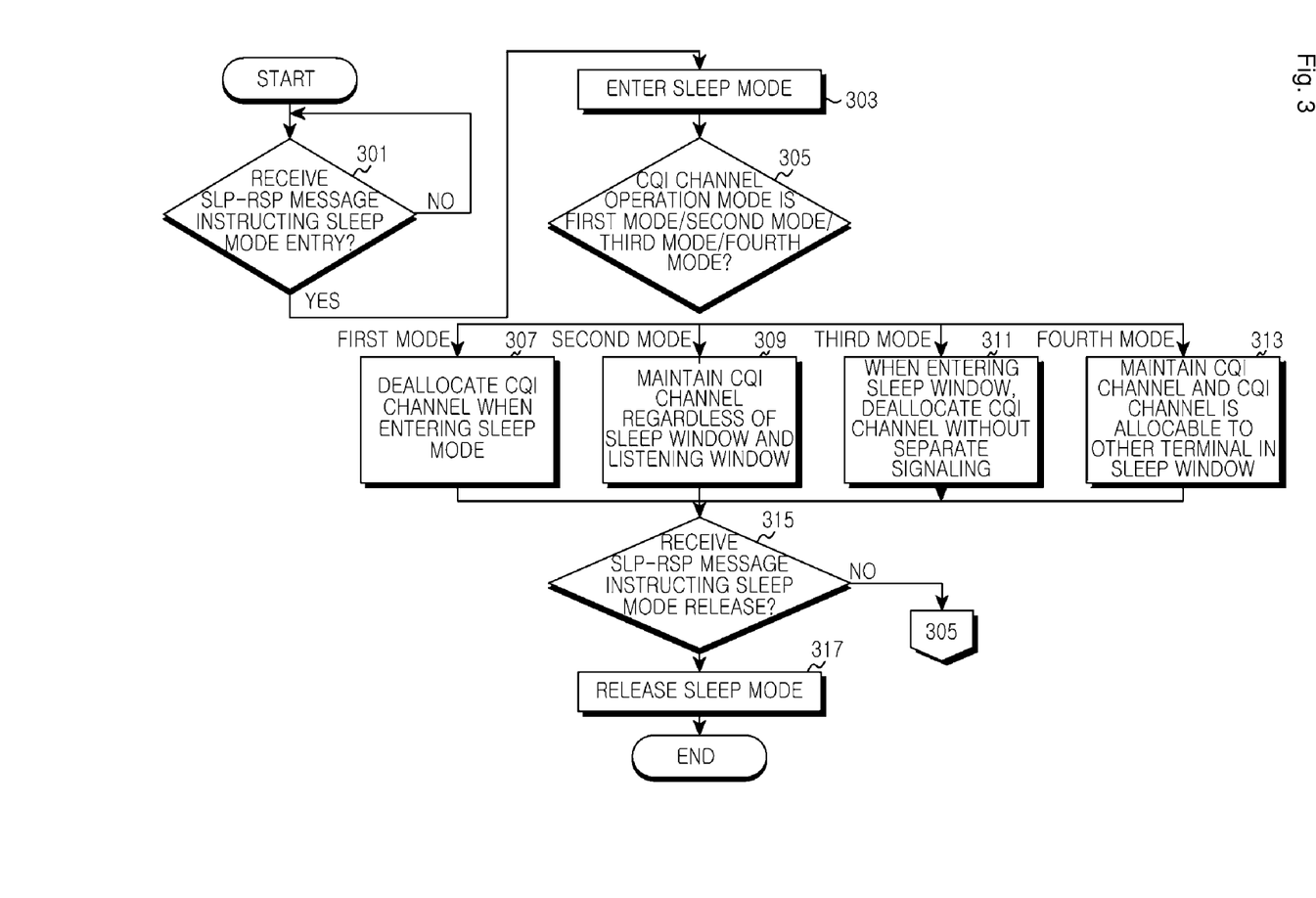
FIG. 3 illustrates a CQI channel management method of a terminal in the broadband wireless communication system according to an exemplary embodiment of the present invention.

FIG. 3 illustrates a CQI channel management method of the terminal in the broadband wireless communication system according to an exemplary embodiment of the present invention. FIG. 3 depicts the CQI channel management method of the terminal entering the sleep mode. While FIG. 3 illustrates only operations of the base station for the CQI channel, the terminal also operates according to the sleep mode, for example, manages the sleep window and the listening window, receives the AAI_TRF-IND message, and communicates in the listening window. Hereafter, other operations according to the sleep mode, excluding the operations for the CQI channel, are omitted.

Referring to FIG. 3, the terminal checks whether the SLP-RSP message instructing the sleep mode entry is received in step 301. The sleep mode entry of the terminal can be instructed in response to the request of the terminal; that is, in response to the SLP-REQ message from the terminal, or according to the base station's own determination. For example, when the traffic of the terminal is lower than a threshold or when the terminal does not transmit or receive the traffic at intervals, the sleep mode entry of the terminal can be instructed.

When receiving the SLP-RSP message instructing the sleep mode entry, the terminal enters the sleep mode in step 303. After confirming the settings for the sleep mode based on the parameter values contained in the SLP-RSP message, the terminal enters the sleep mode.

Next, the terminal checks the CQI channel operation mode of the terminal in step 305. In the exemplary embodiment, the CQI channel operation mode is one of the first mode, the second mode, the third mode, and the fourth mode. However, according to another exemplary embodiment, only the first mode, the third mode, and the fourth mode can be considered.

When the CQI channel operation mode is the first mode, the terminal recognizes the deallocation of the CQI channel of the terminal simultaneously when engering the sleep mode in step 307. In so doing, the signaling for deallocating the CQI channel is not carried out at the time of the sleep mode entry. Yet, separately from the CQI channel operation mode, the terminal can be allocated or deallocate the CQI channel during the sleep mode using the IE for the CQI channel allocation.

When the CQI channel operation mode is the second mode, the terminal recognizes that the CQI channel of the terminal is maintained regardless of the sleep window and the listening window in step 309. At this time, although the terminal is in the sleep state, the CQI channel of the terminal is not allocated to other terminal. Hence, the terminal can feed back the CQI over the CQI channel during the sleep window.

When the CQI channel operation mode is the third mode, the terminal recognizes that the CQI channel is deallocated every time the terminal enters the sleep window in step 311. At this time, the signaling for deallocating the CQI channel is not conducted at the time of the sleep mode entry. Thus, when the CQI channel is allocated to the terminal in the sleep window duration or the listening window duration, the CQI channel is deallocated simultaneously with the sleep window entry without signaling overhead. Separately from the automatic CQI channel deallocation according to the third mode, the terminal can be informed of the deallocation of the CQI channel using the IE indicating the CQI channel deallocation in advance of the sleep window entry.

When the CQI channel operation mode is the fourth mode, the terminal maintains the CQI channel regardless of the sleep window and the listening window in step 313. Yet, the base station can allocate the CQI channel of the terminal to other terminal while the terminal stays in the sleep state. In this case, before the terminal enters the listening window, the base station deallocates the CQI channel allocated to the other terminal.

Next, the terminal checks whether the SLP-RSP message instructing the sleep mode release is received in step 315. The sleep mode release of the terminal can be determined by receiving the request of the terminal; that is, by receiving the SLP-REQ message from the terminal, or according to the base station's own determination. For example, when the traffic of the terminal increases, the sleep mode release of the terminal can be determined.

Upon receiving the SLP-RSP message instructing the sleep mode release, the terminal releases the sleep mode in step 317. When not receiving the SLP-RSP message instructing the sleep mode release, the terminal returns to step 305.

Although it is not illustrated in FIG. 3, the base station can change the CQI channel operation mode while the sleep mode is maintained. In this case, the terminal receives the SLP-RSP message informing of the changed CQI channel operation mode.

The embodiment in FIG. 3 considers all of the first mode, the second mode, the third mode, and the fourth mode. However, in another exemplary embodiment of the present invention, only three or less modes can be considered. In this case, the step 309 is excluded. In yet another exemplary embodiment of the present invention, the third mode alone can be considered. In this case, the SLP-RSP message does not include the information indicating the CQI channel operation mode, and the step 305, the step 307, the step 309, and the step 313 are omitted.

Figure 4:
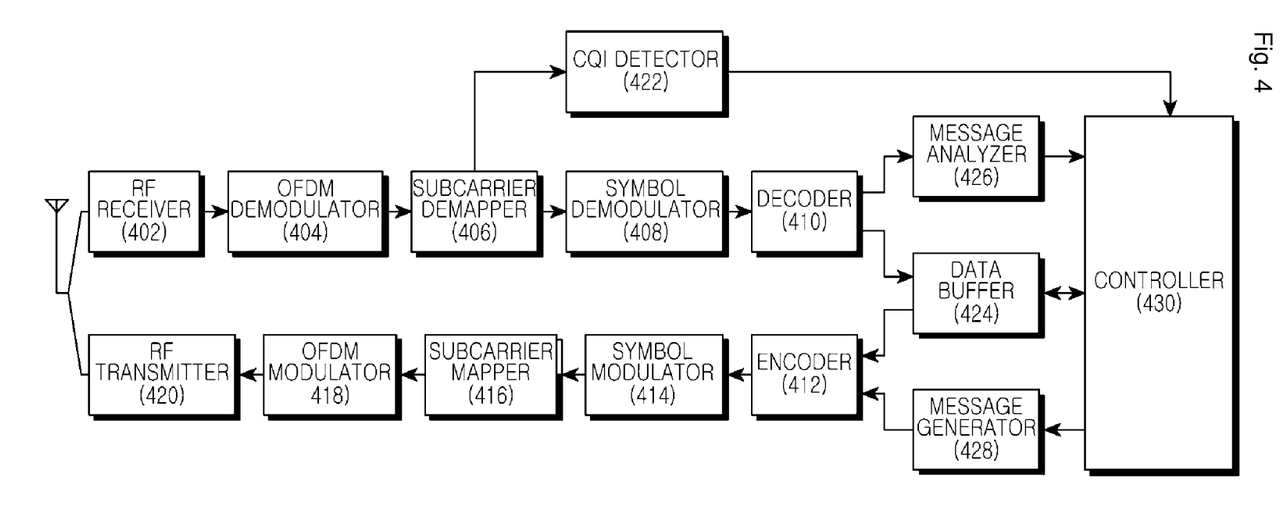
FIG. 4 is a block diagram of the base station in the broadband wireless communication system according to an exemplary embodiment of the present invention.

FIG. 4 is a block diagram of the base station in the broadband wireless communication system according to an exemplary embodiment of the present invention.

As shown in FIG. 4, the base station includes a Radio Frequency (RF) receiver 402, an OFDM demodulator 404, a subcarrier demapper 406, a symbol demodulator 408, a decoder 410, an encoder 412, a symbol modulator 414, a subcarrier mapper 416, an OFDM modulator 418, an RF transmitter 420, a CQI detector 422, a data buffer 424, a message analyzer 426, a message generator 428, and a controller 430.

The RF receiver 402 down-converts an RF signal received via an antenna to a baseband signal. The OFDM demodulator 404 divides the signal output from the RF receiver 402 to OFDM symbols, and restores complex symbols mapped to the frequency domain using a Fast Fourier Transform (FFT) process. The subcarrier demapper 406 classifies the complex symbols mapped to the frequency domain based on the processing unit. The symbol demodulator 408 demodulates and converts the complex symbols to a bit stream. The decoder 410 restores an information bit stream by channel-decoding the bit stream.

The encoder 412 channel-codes the information bit stream. The symbol modulator 414 modulates and converts the channel-coded bit stream to complex symbols. The subcarrier mapper 416 maps the complex symbols into the frequency domain. The OFDM modulator 418 converts the complex symbols mapped to the frequency domain to a time-domain signal using an Inverse FFT (IFFT) process, and constitutes OFDM symbols by inserting a Cyclic Prefix (CP). The RF transmitter 420 up-converts the baseband signal to an RF signal and transmits the RF signal via the antenna.

The CQI detector 422 detects the CQI fed back over the CQI channel. For example, the CQI is received using orthogonal or quasi-orthogonal sequences. In this case, the CQI detector 422 detects a sequence sent by the terminal through correlation operation with candidate sequences, and provides the CQI corresponding to the detected sequence to the controller 430. The data buffer 424 temporarily stores data sent and received to and from the terminal and outputs the stored data under the control of the controller 430.

The message analyzer 426 confirms information contained in a Media Access Control (MAC) management message received from the terminal, and provides the confirmed information to the controller 430. For example, the message analyzer 426 confirms the request of the entry, the release, the change, or the switching of the sleep mode based on the SLP-REQ message received from the terminal. The message generator 428 generates a MAC management message sent to the terminal. For example, the message generator 428 generates the SLP-RSP message indicating the entry, the release, the change, or the switching of the sleep mode, and the map message including the IE for the CQI channel allocation. In so doing, the message generator 428 includes the parameter indicating the CQI channel operation mode during the sleep mode, to the SLP-RSP message. Herein, according to the exemplary embodiment of the present invention, the CQI channel operation modes include at least one of the first mode which deallocates the CQI channel in the sleep mode entry, the second mode which maintains the CQI channel in the sleep mode and forbids the CQI channel allocation to other terminal during the sleep window, the third mode which deallocates the CQI channel in the sleep window entry without signaling, and the fourth mode which maintains the CQI channel in the sleep mode and allows the CQI channel allocation to other terminal during the sleep window. According to another exemplary embodiment of the present invention, the message generator 428 can include the parameter indicating the CQI channel operation mode during the sleep mode, to the sleep control header or the sleep control extension header, rather than the SLP-RSP message.

The controller 430 controls the functions of the base station. For example, the controller 430 allocates the radio resource to the terminal, and determines whether the terminal enters the sleep mode. The sleep mode entry of the terminal can be determined by receiving the request of the terminal; that is, by receiving the SLP-REQ message from the terminal, or according to the determination of the controller 430 by itself. For example, when the traffic of the terminal is lower than the threshold or when the terminal does not transmit or receive the traffic at intervals, the sleep mode entry of the terminal can be determined. When determining the sleep mode entry, the controller 430 determines the settings relating to the sleep mode. For example, the controller 430 determines the sleep cycle, whether to transmit the AAI_TRF-IND message, and the size and the start point of the sleep window. In particular, the controller 430 determines the CQI channel operation mode for the CQI channel of the terminal. For example, the CQI channel operation mode is determined by taking account of the utilization of the radio resources, the traffic characteristics of the terminal, the HARQ application, and the use state of the CQI channel. The controller 430 controls the message generator 428 to generate the SLP-RSP message according to the determined settings, and controls to transmit the SLP-RSP message via the encoder 412, the symbol modulator 414, the subcarrier mapper 416, the OFDM modulator 418, and the RF transmitter 420. When the terminal enters the sleep mode, the controller 430 excludes the terminal from the scheduling during the sleep window, and schedules the terminal only during the listening window. The controller 430 manages the CQI channel of the terminal according to the CQI channel operation mode. The operations of the controller 430 according to the respective modes are now described.

When the CQI channel operation mode is the first mode, the controller 430 deallocates the CQI channel of the terminal simultaneously with the sleep mode entry. In so doing, the signaling for deallocating the CQI channel is not carried out at the time of the sleep mode entry. Yet, separately from the CQI channel operation mode, the controller 430 can allocate and deallocate the CQI channel to and from the terminal during the sleep mode using the IE for the CQI channel allocation.

When the CQI channel operation mode is the second mode, the controller 430 maintains the CQI channel of the terminal regardless of the sleep window and the listening window. At this time, even when the terminal is in the sleep state, the controller 430 does not allocate the CQI channel of the terminal to other terminal. Hence, the controller 430 monitors whether the CQI is fed back from the terminal during the sleep window of the terminal.

When the CQI channel operation mode is the third mode, the controller 430 deallocates the CQI channel for the terminal every time the terminal enters the sleep window. At this time, the signaling for deallocating the CQI channel is not conducted at the time of the sleep mode entry. Separately from the automatic CQI channel deallocation according to the third mode, the controller 430 may deallocate the CQI channel using the IE indicating the CQI channel deallocation in advance of the sleep window entry.

When the CQI channel operation mode is the fourth mode, the controller 430 maintains the CQI channel of the terminal regardless of the sleep window and the listening window. Yet, the controller 430 can allocate the CQI channel of the terminal to other terminal while the terminal stays in the sleep state. In this case, before the terminal enters the listening window, the controller 430 deallocates the CQI channel allocated to the other terminal.

This exemplary embodiment considers all of the first mode, the second mode, the third mode, and the fourth mode. However, in another exemplary embodiment of the present invention, only three or less modes can be considered. In yet another exemplary embodiment of the present invention, the third mode alone can be considered. In this case, the SLP-RSP message does not include the information indicating the CQI channel operation mode, and the controller 430 manages the CQI channel of the terminal according to the third mode.

Figure 5:
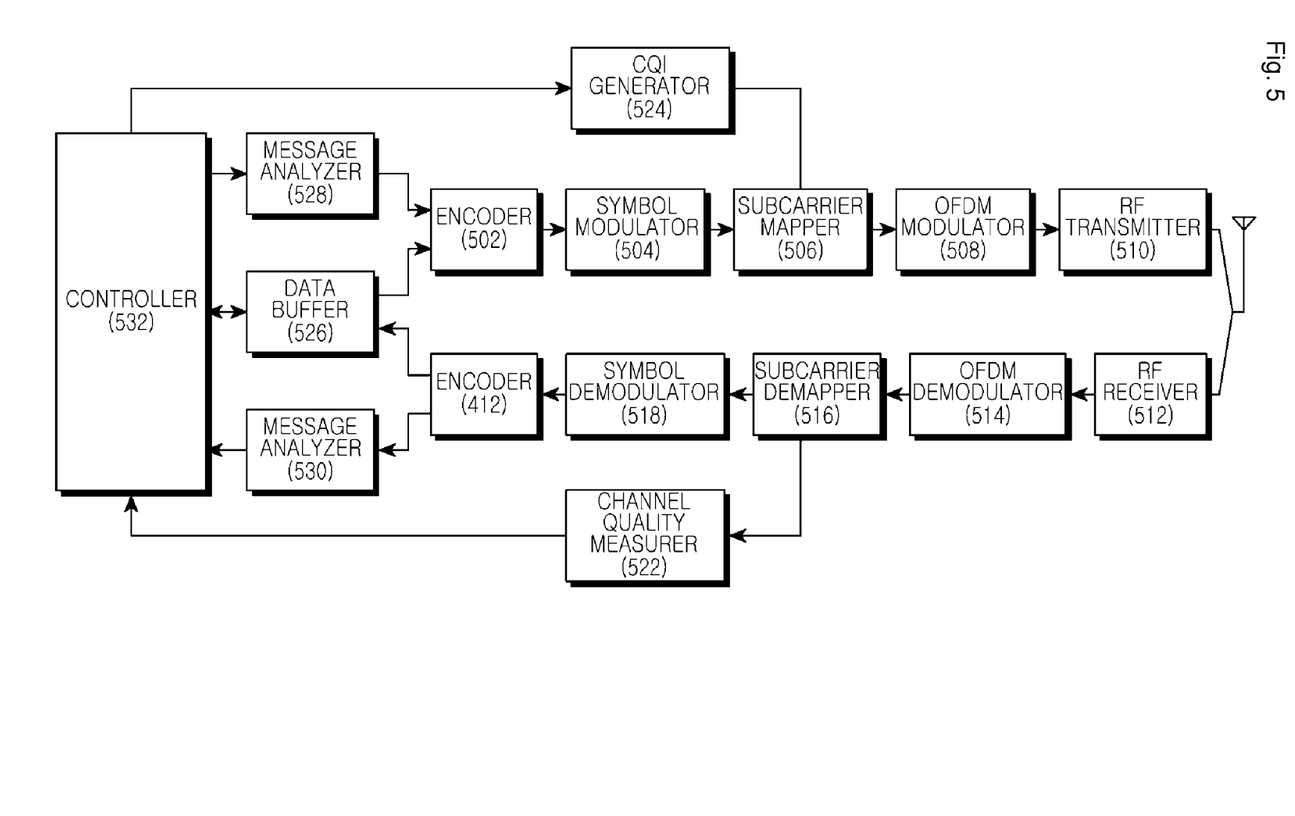
FIG. 5 is a block diagram of the terminal in the broadband wireless communication system according to an exemplary embodiment of the present invention.

FIG. 5 is a block diagram of the terminal in the broadband wireless communication system according to an exemplary embodiment of the present invention.

As shown in FIG. 5, the terminal includes an encoder 502, a symbol modulator 504, a subcarrier mapper 506, an OFDM modulator 508, an RF transmitter 510, an RF receiver 512, an OFDM demodulator 514, a subcarrier demapper 516, a symbol demodulator 518, a decoder 520, a channel quality measurer 522, a CQI generator 524, a data buffer 526, a message generator 528, a message analyzer 530, and a controller 532.

The encoder 502 channel-codes an information bit stream. The symbol modulator 504 modulates and converts the channel-coded bit stream to complex symbols. The subcarrier mapper 506 maps the complex symbols into the frequency domain. The OFDM modulator 508 converts the complex symbols mapped to the frequency domain to a time-domain signal using the IFFT process, and constitutes OFDM symbols by inserting the CP. The RF transmitter 510 up-converts the baseband signal to an RF signal and transmits the RF signal via an antenna.

The RF receiver 512 down-converts an RF signal received via the antenna to a baseband signal. The OFDM demodulator 514 divides the signal output from the RF receiver 512 to OFDM symbols, and restores complex symbols mapped to the frequency domain using the FFT process. The subcarrier demapper 516 classifies the complex symbols mapped to the frequency domain based on the processing unit. The symbol demodulator 518 demodulates and converts the complex symbols to a bit stream. The decoder 520 restores an information bit stream by channel-decoding the bit stream.

The channel quality measurer 522 measures the channel quality with the base station. For example, the channel quality measurer 522 measures the channel quality using signals of the predefined value, such as preamble and pilot. The CQI generator 524 generates the CQI indicating the channel quality measured by the channel quality measurer 522. For example, the CQI is the orthogonal or quasi-orthogonal sequences. In this case, the CQI generator 524 selects the sequence corresponding to the measured channel quality among the sequences, and generates the complex symbol stream rep-resenting the sequence. The data buffer 526 temporarily stores data sent and received to and from the base station, and outputs the stored data under the control of the controller 532.

The message generator 528 generates a MAC management message sent to the base station. For example, the message generator 528 generates the SLP-REQ message re-questing the entry, the release, the change, or the switching of the sleep mode. The message analyzer 530 confirms information contained in the MAC management message received from the base station, and provides the confirmed information to the controller 532. For example, the message analyzer 530 confirms the instruction of the entry, the release, the change, or the switching of the sleep mode based on the SLP-RSP message, and confirms the resource for the traffic and the CQI channel allocation information based on the map message. In particular, the message analyzer 530 confirms the parameter indicating the CQI channel operation mode during the sleep mode, in the SLP-RSP message. Herein, according to the exemplary embodiments of the present invention, the CQI channel operation modes includes at least one of the first mode which deallocates the CQI channel in the sleep mode entry, the second mode which maintains the CQI channel in the sleep mode and forbids the CQI channel allocation to other terminal during the sleep window, the third mode which deallocates the CQI channel in the sleep window entry without signaling, and the fourth mode which maintains the CQI channel in the sleep mode and allows the CQI channel allocation to other terminal during the sleep window. According to another exemplary embodiment of the present invention, the message analyzer 530 can confirm the parameter indicating the CQI channel operation mode during the sleep mode, from the sleep control header or the sleep control extension header, rather than the SLP-RSP message.

The controller 532 controls the functions of the terminal. For example, the controller 532 determines whether the terminal enters the sleep mode. For example, when the traffic of the terminal falls below the threshold or when the terminal does not transmit or receive the traffic at intervals, the controller 532 determines the sleep mode entry and controls the message generator 528 to generate the SLP-REQ message. When the SLP-RSP message instructing the sleep mode entry is received by the message analyzer 530, the controller 532 controls to enter and operate in the sleep mode. That is, the controller 532 controls not to communicate during the sleep window and to communicate during the listening window. In so doing, the controller 532 manages the CQI channel according to the CQI channel operation mode confirmed from the SLP-RSP message. The operations of the controller 532 according to the respective modes are now described.

When the CQI channel operation mode is the first mode, the controller 532 recognizes the deallocation of the CQI channel of the terminal simultaneously with the sleep mode entry. In so doing, the signaling for deallocating the CQI channel is not carried out at the time of the sleep mode entry. Yet, separately from the CQI channel operation mode, the controller 532 can be allocated or deallocate the CQI channel during the sleep mode using the IE for the CQI channel allocation.

When the CQI channel operation mode is the second mode, the controller 532 recognizes that the CQI channel of the terminal is maintained regardless of the sleep window and the listening window. At this time, even when the terminal is in the sleep state, the CQI channel of the terminal is not allocated to other terminal. Hence, the controller 532 can feed back the CQI over the CQI channel during the sleep window.

When the CQI channel operation mode is the third mode, the controller 532 recognizes that the CQI channel is deallocated in every sleep window entry. At this time, the signaling for deallocating the CQI channel is not conducted at the time of the sleep mode entry. Separately from the automatic CQI channel deallocation according to the third mode, the controller 532 can be informed of the deallocation of the CQI channel using the IE indicating the CQI channel deallocation in advance of the sleep window entry.

When the CQI channel operation mode is the fourth mode, the controller 532 maintains the CQI channel regardless of the sleep window and the listening window. Yet, the base station can allocate the CQI channel of the terminal to other terminal while the terminal stays in the sleep state. In this case, before the controller 532 enters the listening window, the base station deallocates the CQI channel allocated to the other terminal.

This embodiment considers all of the first mode, the second mode, the third mode, and the fourth mode. However, in another exemplary embodiment of the present invention, only three or less modes can be considered. In yet another exemplary embodiment of the present invention, the third mode alone can be considered. In this case, the SLP-RSP message does not include the information indicating the CQI channel operation mode, and the controller 532 manages the CQI channel of the terminal according to the third mode.

By suggesting the allocation and deallocation method of the CQI channel in consideration of the characteristics of the sleep mode in the broadband wireless communication system, the signaling overhead due to the allocation and the deallocation of the CQI channel is reduced.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method of operating a base station in a broadband wireless communication system, the method comprising:
   determining a Channel Quality Indicator (CQI) channel operation mode for a CQI channel of a terminal which enters a sleep mode if the terminal enters the sleep mode;
   transmitting a message that instructs to enter the sleep mode and comprises information indicating the CQI channel operation mode; and
   managing the CQI channel of the terminal according to the CQI channel operation mode while the terminal operates in the sleep mode,
   wherein the CQI channel operation mode indicates whether the CQI channel is deallocated and whether a CQI channel allocation to another terminal during a sleep window is allowed.

2. The method of claim 1, further comprising:
   when the CQI channel operation mode is determined as a third mode and the terminal enters the sleep window, deallocating the CQI channel of the terminal without signaling; and
   when the terminal enters a listening window, allocating the CQI channel to the terminal using an Information Element (IE) for CQI channel allocation.

3. The method of claim 1, further comprising:
   when the CQI channel operation mode is determined as a fourth mode and the terminal enters the sleep window, allocating the CQI channel of the terminal, to the other terminal.

4. An apparatus of a base station in a broadband wireless communication system, the apparatus comprising:
   a controller configured to determine a Channel Quality Indicator (CQI) channel operation mode for a CQI channel of a terminal which enters a sleep mode if the terminal enters the sleep mode; and
   a transmitter configured to transmit a message that instructs to enter the sleep mode and comprises information indicating the CQI channel operation mode,
   wherein the controller is configured to manage the CQI channel of the terminal according to the CQI channel operation mode while the terminal operates in the sleep mode, and
   wherein the CQI channel operation mode indicates whether the CQI channel is deallocated and whether a CQI channel allocation to another terminal during a sleep window is allowed.

5. The apparatus of claim 4, wherein, when the CQI channel operation mode is determined as a third mode and the terminal enters the sleep window, the controller is configured to deallocate the CQI channel of the terminal without signaling, and when the terminal enters a listening window, the controller is configured to allocate the CQI channel to the terminal using an Information Element (IE) for CQI channel allocation.

6. The apparatus of claim 4, wherein, when the CQI channel operation mode is determined as a fourth mode and the terminal enters the sleep window, the controller is configured to allocate the CQI channel of the terminal, to the other terminal.

7. A method of operating a terminal in a broadband wireless communication system, the method comprising:
   receiving a message that instructs to enter a sleep mode and comprises information indicating a Channel Quality Indicator (CQI) channel operation mode; and
   managing a CQI channel according to the CQI channel operation mode while operating in the sleep mode,
   wherein the CQI channel operation mode indicates whether the CQI channel is deallocated and whether a CQI channel allocation to another terminal during a sleep window is allowed.

8. The method of claim 7, further comprising:
   when the CQI channel operation mode is determined as a third mode and the terminal enters the sleep window, recognizing that the CQI channel is deallocated without signaling; and
   when entering a listening window, being allocated the CQI channel using an Information Element (IE) for CQI channel allocation.

9. An apparatus of a terminal in a broadband wireless communication system, the apparatus comprising:
   a receiver configured to receive a message that instructs to enter a sleep mode and comprises information indicating a Channel Quality Indicator (CQI) channel operation mode; and
   a controller is configured manage a CQI channel according to the CQI channel operation mode while operating in the sleep mode,
   wherein the CQI channel operation mode indicates whether the CQI channel is deallocated and whether a CQI channel allocation to another terminal during a sleep window is allowed.

10. The apparatus of claim 9, wherein, when the CQI channel operation mode is determined as a third mode and the terminal enters the sleep window, the controller is configured to recognize that the CQI channel is deallocated without signaling, and when entering a listening window, the controller is allocated the CQI channel using an Information Element (IE) for CQI channel allocation.

11. The apparatus of claim 9, wherein the message instructing the entry to the sleep mode and comprising the information indicating the CQI channel operation mode, is a SLeeP-ReSPonse (SLP-RSP) message.

12. The apparatus of claim 9, wherein the message instructing the entry to the sleep mode and comprising the information indicating the CQI channel operation mode, comprises one of a sleep control header and a sleep control extension header which comprises information indicating the CQI channel operation mode.

13. The method of claim 1, wherein the message instructing the entry to the sleep mode and comprising the information indicating the CQI channel operation mode, is a SLeeP-ReSPonse (SLP-RSP) message.

14. The method of claim 1, wherein the message instructing the entry to the sleep mode and comprising the information indicating the CQI channel operation mode, comprises one of a sleep control header and a sleep control extension header which comprises information indicating the CQI channel operation mode.

15. The apparatus of claim 4, wherein the message instructing the entry to the sleep mode and comprising the information indicating the CQI channel operation mode, is a SLeeP-ReSPonse (SLP-RSP) message.

16. The apparatus of claim 4, wherein the message instructing the entry to the sleep mode and comprising the information indicating the CQI channel operation mode, comprises one of a sleep control header and a sleep control extension header which comprises information indicating the CQI channel operation mode.

17. The method of claim 7, wherein the message instructing the entry to the sleep mode and comprising the information indicating the CQI channel operation mode, is a SLeeP-ReSPonse (SLP-RSP) message.

18. The method of claim 7, wherein the message instructing the entry to the sleep mode and comprising the information indicating the CQI channel operation mode, comprises one of a sleep control header and a sleep control extension header which comprises information indicating the CQI channel operation mode.

19. The method of claim 1, wherein candidates of the CQI channel operation mode comprise at least one of a first mode which deallocates the CQI channel in entry of the sleep mode, a second mode which maintains the CQI channel in the sleep mode and forbids CQI channel allocation to another terminal during a sleep window, a third mode which deallocates the CQI channel in entry of the sleep window without signaling, and a fourth mode which maintains the CQI channel in the sleep mode and allows the CQI channel allocation to the other terminal during the sleep window.

20. The apparatus of claim 4, wherein candidates of the CQI channel operation mode comprise at least one of a first mode which deallocates the CQI channel in entry of the sleep mode, a second mode which maintains the CQI channel in the sleep mode and forbids CQI channel allocation to another terminal during a sleep window, a third mode which deallocates the CQI channel in entry of the sleep window without signaling, and a fourth mode which maintains the CQI channel in the sleep mode and allows the CQI channel allocation to the other terminal during the sleep window.

21. The method of claim 7, wherein candidates of the CQI channel operation mode comprise at least one of a first mode which deallocates the CQI channel in entry of the sleep mode, a second mode which maintains the CQI channel in the sleep mode and forbids CQI channel allocation to another terminal during a sleep window, a third mode which deallocates the CQI channel in entry of the sleep window without signaling, and a fourth mode which maintains the CQI channel in the sleep mode and allows the CQI channel allocation to the other terminal during the sleep window.

22. The apparatus of claim 9, wherein candidates of the CQI channel operation mode comprise at least one of a first mode which deallocates the CQI channel in entry of the sleep mode, a second mode which maintains the CQI channel in the sleep mode and forbids CQI channel allocation to another terminal during a sleep window, a third mode which deallocates the CQI channel in entry of the sleep window without signaling, and a fourth mode which maintains the CQI channel in the sleep mode and allows the CQI channel allocation to the other terminal during the sleep window.

\* \* \* \* \*